United States Patent
Bhate

(10) Patent No.: US 9,596,262 B2
(45) Date of Patent: Mar. 14, 2017

(54) DETERMINATION OF ADAPTIVE IDLE TIMEOUT

(71) Applicant: Cisco Technology, Inc., San Jose, CA (US)

(72) Inventor: Mitesh Bhate, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 4 days.

(21) Appl. No.: 14/072,248

(22) Filed: Nov. 5, 2013

(65) Prior Publication Data

US 2014/0059682 A1 Feb. 27, 2014

Related U.S. Application Data

(63) Continuation of application No. 13/009,516, filed on Jan. 19, 2011, now Pat. No. 8,578,022.

(51) Int. Cl.
G06F 15/173 (2006.01)
G06F 15/16 (2006.01)
H04L 29/06 (2006.01)

(52) U.S. Cl.
CPC ...... H04L 63/1458 (2013.01); H04L 63/1425 (2013.01)

(58) Field of Classification Search
CPC ............ H04L 63/1408; H04L 63/1425; H04L 63/1458
USPC ......................................... 709/224, 228, 229
See application file for complete search history.

(56) References Cited

U.S. PATENT DOCUMENTS

| 7,287,082 B1* | 10/2007 | O'Toole, Jr. ........ H04L 67/1008 709/223 |
| 8,578,022 B2 | 11/2013 | Bhate |
| 2002/0106991 A1* | 8/2002 | Foore et al. .................... 455/70 |
| 2002/0129140 A1* | 9/2002 | Peled et al. ................... 709/224 |
| 2003/0037164 A1* | 2/2003 | Chaar et al. .................. 709/237 |
| 2005/0055399 A1* | 3/2005 | Savchuk ....................... 709/203 |
| 2008/0144613 A1* | 6/2008 | Adhikari et al. ............. 370/389 |
| 2011/0093946 A1* | 4/2011 | Chen .............................. 726/13 |

* cited by examiner

Primary Examiner — Tonia L Dollinger
Assistant Examiner — Adam Cooney
(74) Attorney, Agent, or Firm — Merchant & Gould P.C.

(57) ABSTRACT

In various embodiments, a method may be provided comprising: determining an adaptive idle timeout value based on the relationship between the number of established TCP connections to a server and the upper threshold value.

19 Claims, 4 Drawing Sheets

DETERMINATION OF ADAPTIVE IDLE TIMEOUT

CROSS-REFERENCE TO RELATED PATENT APPLICATIONS

This patent application is a continuation of U.S. patent application Ser. No. 13/009,516, filed Jan. 19, 2011 (issued as U.S. Pat. No. 8,578,022 on Nov. 5, 2013), the disclosure of which is incorporated herein, in its entirety, by reference.

TECHNICAL-FIELD

The present disclosure relates generally to preventing denial of service attacks and specifically to preventing denial of service attacks when a TCP connection is in an ESTAB ("Established") state.

BACKGROUND

With today's high speed networks, the need for preventing denial of service ("DOS") and distributed denial of service ("DDOS") attacks is much greater. With the tools and high-end machines available today, malicious attackers may easily overwhelm an unprotected system with a DOS or DDOS attack. Thus a need exists for a system to prevent DOS and DDOS attacks when a TCP connection is in an established state.

BRIEF DESCRIPTION OF THE DRAWINGS

Many aspects of the disclosure can be better understood with reference to the following drawings. The components in the drawings are not necessarily to scale. Emphasis is instead placed upon clearly illustrating the principles of the present disclosure. Moreover, in the drawings, like references numerals designate corresponding parts through the several figures.

DETAILED DESCRIPTION OF EXAMPLE EMBODIMENTS

In various embodiments, a method may be provided comprising: determining a number of established TCP connections to a server; comparing the number of established TCP connections to the server to a upper threshold value; and if the number of established TCP connections to the server is greater than or equal to the upper threshold value, determine an adaptive idle timeout value based on the relationship between the number of established TCP connections to a server and the upper threshold value.

Consistent with some embodiments of the present invention, a method may be provided comprising: scanning TCP connections to a server to identify idle and active connections; and removing TCP connections that have been idle for a period longer than an adaptive idle timeout, wherein the adaptive idle timeout value is determined based on the total number of established TCP connections.

Consistent with some embodiments of the present invention, a system may be provided comprising: a server, wherein the server is programmed to: determine a number of established TCP connections to a server; compare the number of established TCP connections to the server to a upper threshold value; and if the number of established TCP connections to the server is greater than or equal to the upper threshold value, determine an adaptive idle timeout value based on the relationship between the number of established TCP connections to a server and the upper threshold value.

Figure 1:
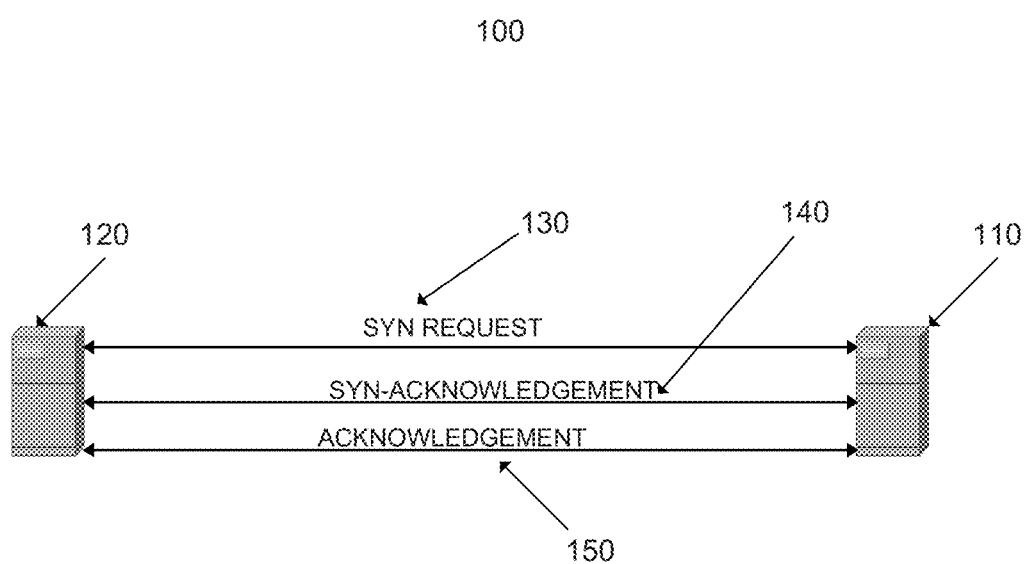
FIG. 1 is a block diagram illustrating an example environment in which certain embodiments of the present invention may be implemented.

FIG. 1 is a block diagram illustrating a network system 100 in which certain embodiments of the present invention may be implemented. Network system 100 may comprise, for example, a subscriber television network, though other networks are contemplated to be within the scope of this disclosure. Network system 100 may include a plurality of individual networks, such as a wireless network and/or a wired network, including wide-area networks (WANs), local area networks (LANs), among others.

Transmitting nodes in system 100, such as server 120 and client 110 may also comprise other components, such as QAM modulators, routers, bridges, Internet Service Provider (ISP) facility servers, private servers, on-demand servers, multi-media messaging servers, content schedule servers, gateways, multiplexers, and/or transmitters, among other equipment, components, and/or computing and communication devices.

Though system 100 is illustrated to comprise only one data transmission node on each side of the communications, in various embodiments, system 100 may comprise any number of clients 110 and servers 120.

Embodiments of the present invention may be implemented in hardware, software, firmware, or a combination thereof (collectively or individually also referred to herein as logic). To the extent certain embodiments, or portions thereof, are implemented in software or firmware, executable instructions or code for performing one or more tasks are stored in memory or any other suitable computer readable medium and executed by a suitable instruction execution system. In the context of this document, a computer readable medium is an electronic, magnetic, optical, or other physical device or means that can contain or store a computer program for use by or in connection with a computer related system or method.

To the extent embodiments, or portions thereof, are implemented in hardware, the present invention may be implemented with any or a combination of the following technologies: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Attacks on established TCP connections may include a Synchronization ("SYN") Flood attack. An SYN flood is a form of denial-of-service attack in which an attacker sends a succession of SYN requests 130 to a target's system. When client 110 attempts to start a TCP connection to server 120, client 110 and server 120 exchange a series of messages which normally runs like this: 1) Client 110 may request a connection by sending a SYN message 130 to server 120. 2) Server 120 acknowledges this request by sending SYN-Acknowledgement ("SYN-ACK") 140 back to client 110. 3) Client 110 may respond with an Acknowledgement ("ACK") 150, and the connection is established. This may be referred to as called the TCP three-way handshake, and is typically the foundation for every connection established using the TCP protocol.

The SYN flood is a well known type of attack and is generally effective if server 120 allocates resources after receiving a SYN 130, but before it has received the ACK 150. Methods of SYN flooding may involve server 120 not receiving the ACK 150. A malicious client 110 may skip sending this last ACK message 150. Alternatively, client 110 may spoof the source IP address in the SYN 130. This may make server 120 send the SYN-ACK 140 to the falsified IP address, and client 110 will never receive the ACK 150. In either case, server 120 may wait for the acknowledgement 150 for some time, as simple network congestion could potentially be the cause of a missing ACK 150.

If these half-open connections bind resources on server 120, it may be possible to take these resources by flooding server 120 with additional SYN messages 130. Once all resources set aside for half-open connections are reserved, no new connections (legitimate or not) may be made. This can result is denial of service for legitimate users. Some systems may malfunction badly or even crash if other operating system functions are starved of resources this way. In other scenarios so-called reflective routers can also be used as attackers, instead of client machines 110.

Previous attempted solutions to this problem (such as SYN-cookie) have focused on mitigating the effects of the SYN flood attack. However, a malicious attacker may use legitimate source IP addresses to attempt to complete the three-way handshake and then stay idle afterwards, consuming the resources of server 120. Once the TCP three-way handshake has been completed, server 120 resources may be held up for a long period of time. This period of time may be defined by an idle timeout. The idle timeout in previous systems is typically quite high once the TCP connection reaches an established state.

Notably, client 110 can establish a three-way handshake with server 120 without consuming system resources of the client 110. For example, a packet crafting library, such as libnet, and a packet capturing library like libpcap may be employed by a malicious client 110. The malicious user's client 110 may flood SYN packets to server 120 with different source points (e.g., through use of a libnet library). The malicious client 110 may then capture the SYN-ACK 140 from server 120 (e.g., with libpcap) and respond back with an ACK 150 to complete the three-way handshake without consuming any resources on the client side. Given that 64K different source ports may be used in this implementation, the resources on server 120 to handle new connections may easily be drained by the malicious user using only a few machines.

For example, Application Control Engine ("ACE") may be a load balancer that may also act as a proxy for making loadbearing decisions and offloading services like SSL. ACE may handle 256K proxied connection and the idle timeout for each of these TCP connections in established mode may be one hour. If the Virtual IP address receives three-way handshakes from a few malicious hosts who intend to complete the three-way handshake and nothing more, all proxied connection that can be handled be ACE may be used up by these hosts and deprive legitimate hosts of service.

Embodiments of the present invention employ an adaptive idle timeout to be used to TCP connection in established mode. The adaptive idle timeout may decrease with an increase in the number of open connections in the system. The adaptive idle timeout may come into play when the number of connections reaches an upper threshold value. The threshold value may be configured by a user. The present invention to prevent DOS or DDOS attacks may be implemented on either proxies or hosts.

For example, Adaptive Idle Timeout ("AIT") may be equal to:

AIT (New)=alpha*AIT(Current)—when total connections>upper threshold value

AIT=Initial timeout—when total connections<lower threshold value

Alpha may be a real number between 0 and 1. Alpha may further be calculable based on system conditions. The Initial timeout value may equal the timeout configured for when the system does not have any connections. The lower threshold value represents a value, that once adaptive idle timeout is in play, may determine a lower threshold of number of connections below which adaptive idle timeout may be taken out of play.

The range between the upper threshold value and the maximum number of possible connections may be separated into n equal intervals. N may be a user configured value. Thus, when each interval is reached, the adaptive idle timeout may be recalculated. The alpha value may be used to recalculate the adaptive idle timeout value at each interval. The alpha value may be chosen based on the rate of increased connections once the initial upper threshold is reached.

EXAMPLE 1

Assume:
Alpha=0.5
Lower threshold value=0.4
Upper threshold value=0.5
N=0.1
Initial timeout=0.1

With these values assumed, adaptive idle timeout comes into to play once the total number of connection reaches 50% of the maximum value. The adaptive idle timeout value may then be adjusted at every 10% increase in the number of connections by reducing the adaptive idle timeout value by half.

Sample Values:

| Idle Timeout | # of established connections/max # of connections |
| --- | --- |
| 1 hour | 0.1 |
| 1 hour | 0.5 |
| 30 minutes | 0.6 |
| 15 minutes | 0.7 |
| 7.5 minutes | 0.8 |
| 3.75 minutes | 0.9 |

In some embodiments, a proxy may operate a scan thread that periodically monitors all of the connections for timeout and may clear out connections determined to be idle. Thus, during each scan, the total number of connections can be determined and the adaptive idle timeout may be modified accordingly so that the idle connections are cleared from the system faster when the system load is higher.

Figure 2:
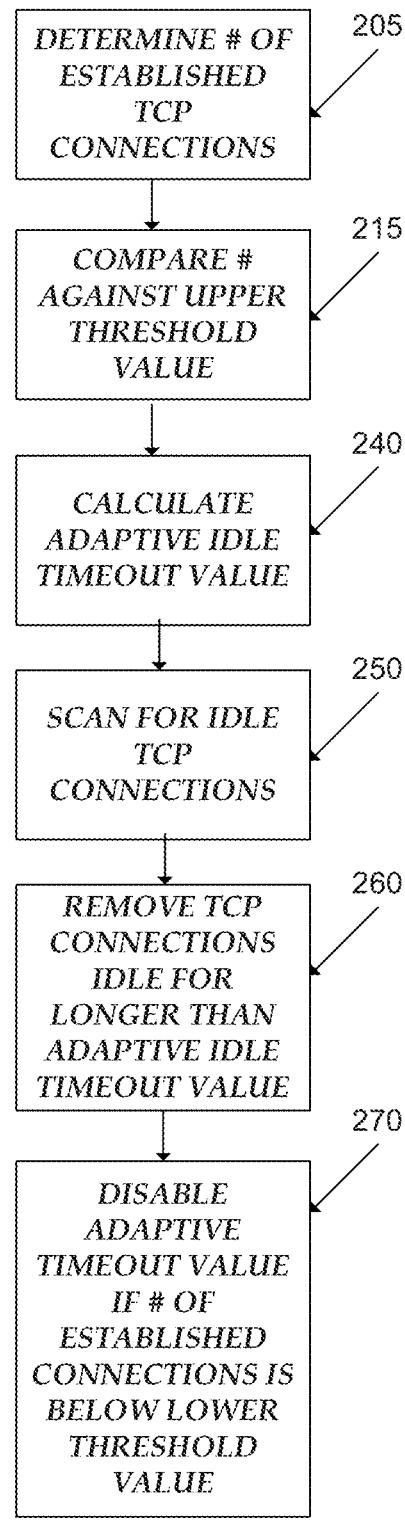
FIG. 2 is a flow chart of a method for providing certain embodiments of the present invention.

FIG. 2 illustrates a flow chart showing the operation of embodiments of the present invention. The method may begin at step 205, where the number of established TCP connections to a server may be determined. As discussed, in some embodiments, the step of determining may be accomplished by a proxy. Once step 205 has been completed, the method may proceed to step 215. At step 215 the number of established TCP connections to the server may be compared to an upper threshold value. The upper threshold value may be user-configurable or based on system parameters.

The method may then proceed to step 230 where it may be determined whether the number of established TCP connections to the server is greater than or equal to the upper threshold value. If the number of connection does equal or exceed the upper threshold value, the method may proceed to step 240. At step 240, an adaptive idle timeout value may be calculated based on the relationship between the number of established TCP connections to a server and the upper threshold value. For example, the adaptive idle timeout value may be multiplied with an alpha value when the number of established TCP connections to the server is greater than or equal to the upper threshold value. In some embodiments the alpha value may be between 0 and 1. It should also be noted that the alpha value may be user-configured or automatically calculated based on system conditions.

Similarly, the alpha value may decrease as the number of established TCP connections to the server increases. Alternatively, the alpha value may decrease as the rate of newly established TCP connections to the server increases. In some embodiments of the present invention, the difference between the upper threshold value and the maximum number of available connections may be divided into equal intervals. The alpha value may be decreased as the number of established TCP connections to the server reaches each interval. The number of intervals created may be a user-configurable value.

The method may then proceed to step 250 where scanning for idle TCP connections may take place. Again, the step of scanning may be performed by the server itself or a proxy device. Once idle TCP connections have been located, the method may proceed to step 260. At step 260, the idle TCP connections that have been idle for a period longer than the adaptive idle timeout value may be cleared from the system.

In some embodiments a lower threshold value may be determined. The method may at some time proceed to step 270 and disable the adaptive idle timeout value when the number of established TCP connections to a server is lower than the lower threshold value.

Figure 3:
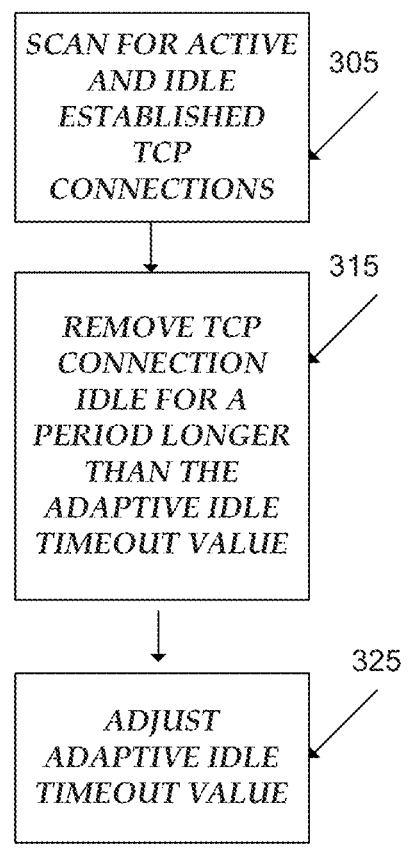
FIG. 3 is a flow chart of a method for providing certain embodiments of the present invention.

FIG. 3 illustrates a flow chart showing the operation of embodiments of the present invention. At step 305, TCP connections to a server may be scanned to identify idle and active connections. The method may then proceed to step 315 where TCP connections may be removed that have been idle for a period longer than an adaptive idle timeout, wherein the adaptive idle timeout value may be determined based on the total number of established TCP connections.

As the total number of established TCP connections increases, the method may proceed to step 325, where the adaptive idle timeout value may be decreased. In some embodiments of the present invention, the step of decreasing the adaptive idle timeout value only occurs when the total number of established TCP connections is above an upper threshold value. Furthermore, in some embodiments a plurality of interval thresholds may also be defined which may trigger a modification of the adaptive idle timeout value.

Embodiments of the present invention may provide a mechanism that may provide a mechanism which can mitigate attacks where the malicious client(s) does not use spoofed IP addresses, but instead use their own IP addresses and thus may respond to respond to keepalives sent by an end host. When under attack, the use of keepalives may be unwanted since the malicious client may respond back to the keepalives and resultantly keep the connection open and consume the host's resources.

As such, embodiments of the present invention may use adaptively timeout such connections "silently" to free up connections that are idle as no trigger may be provided back to the malicious client. During an attack, the connections need to be timed out silently to avoid providing information to the malicious clients.

Embodiments of the present invention may incorporate reset timeouts to notify genuine clients to close the connection when the host times out the connection on its end. As a result, the client connection should avoid getting hung up. Similarly, when dealing with a genuine client, keepalives may be a good way to know if the remote end of the connection is no longer active and that the host needs to free up these additional resources. However, when dealing with a malicious client, using a reset timeout and keepalives may again be problematic as it may provide triggers for the malicious client to reopen the connection.

Accordingly, embodiments of the present invention may distinguish between "peace time" and "attack time". During peace time, reset timeouts and keepalives may be used. During attack time, silent timeouts with no keepalives may be employed. Attack time may be a user-defined parameter based on the number of active open connections and/or the number of connections open for each source IP address.

For example, attack time may be defined as the period of time when the number of currently open connections exceeds an upper threshold of total connections that can be opened in the system. Alternatively, attack time may be defined as the period of time when the number of currently open connections exceeds an upper threshold on a per-source-IP address basis.

Similarly, peace time may be defined as the period of time when the number of currently open connections is less than a lower threshold of total connections that can be opened in the system. Alternatively, peace time may be defined as the period of time when the number of currently open connections is less than a lower threshold on a per-source-IP address basis. It should be understood that the definitions of peace time and attack time may be configurable based on a user selection of parameters. Accordingly, when embodiments of the present invention employ a per-source-IP address threshold, the adaptive idle timeout value may come into play only for connections originated by a source IP address which has passed the per-source-IP address upper threshold.

The systems and methods described in FIGS. 1-3 may be implemented using a network device 400 as described in more detail below with respect to FIG. 4. The network device may comprise, for example, but is not limited to, any transmitting network node device depicted in FIG. 1 such as server 120.

Figure 4:
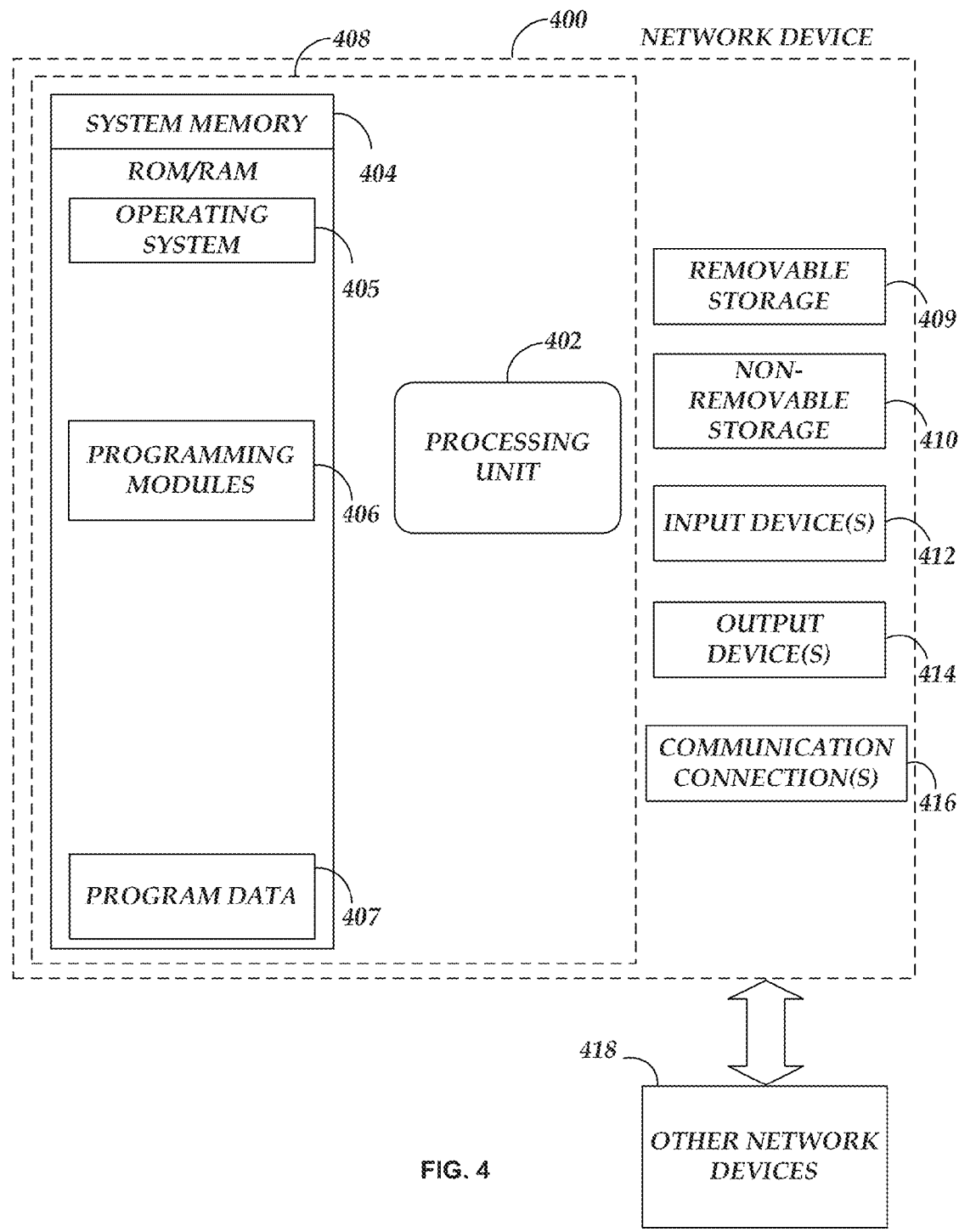
FIG. 4 is a block diagram of a system including a network device.

FIG. 4 is a block diagram of a system including network device 400. Consistent with embodiments of the present invention, the aforementioned memory storage and processing unit may be implemented in a network device, such as network device 400 of FIG. 4. Any suitable combination of hardware, software, or firmware may be used to implement the memory storage and processing unit. For example, the memory storage and processing unit may be implemented with network device 400 or any of other network devices 418, in combination with network device 400. The aforementioned system, device, and processors are examples and other systems, devices, and processors may comprise the aforementioned memory storage and processing unit, consistent with embodiments of the present invention. Furthermore, network device 400 may comprise an operating environment for system 100 as described above. System 100 may operate in other environments and is not limited to network device 400.

With reference to FIG. 4, a system consistent with embodiments of the present invention may include a network device, such as network device 400. In a basic configuration, network device 400 may include at least one processing unit 402, a secure processing unit for decryption 420, and a system memory 404. Depending on the configuration and type of network device, system memory 404 may comprise, but is not limited to, volatile (e.g., random access memory (RAM)), non-volatile (e.g., read-only memory (ROM)), flash memory, or any combination. System memory 404 may include operating system 405, one or more programming modules 406, and may include program data 407. Operating system 405, for example, may be suitable for controlling network device 400's operation. Furthermore, embodiments of the present invention may be practiced in conjunction with a graphics library, other operating systems, or any other application program and is not limited to any particular application or system. This basic configuration is illustrated in FIG. 4 by those components within a dashed line 408.

Network device 400 may have additional features or functionality. For example, network device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by network device 400. Any such computer storage media may be part of device 400. Network device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Network device 400 may also contain a communication connection 416 that may allow device 400 to communicate with other network devices 418, such as over a network in a distributed network environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402 or secure processing unit for decryption 420, programming modules 406 may perform processes including, for example, one or more method 200's stages as described above. The aforementioned process is an example; processing unit 402 and secure processing unit for decryption 420 may perform other processes.

Generally, consistent with embodiments of this invention, program modules may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments of the present invention may also be practiced in distributed network environments where tasks are performed by remote processing devices that are linked through a communications network. In a distributed network environment, program modules may be located in both local and remote memory storage devices.

Furthermore, embodiments of the present invention may be practiced in an electrical circuit comprising discrete electronic elements, packaged or integrated electronic chips containing logic gates, a circuit utilizing a microprocessor, or on a single chip containing electronic elements or microprocessors. Embodiments may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, may be implemented as a computer process (method), a network system, or as an article of manufacture, such as a computer program product or computer readable media. The computer program product may be a computer storage media readable by a computer system and encoding a computer program of instructions for executing a computer process. The computer program product may also be a propagated signal on a carrier readable by a network system and encoding a computer program of instructions for executing a computer process. Accordingly, aspects of the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the present invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the present invention have been described, other embodiments may exist. Furthermore, although embodiments have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the present invention.

At least the following is claimed:

1. A method comprising:
   determining an adaptive idle timeout value applicable for a plurality of TCP connections in established mode at a network device, wherein determining the adaptive idle timeout value comprises:
   classifying a range between a second threshold value and a maximum value for TCP connections into a predetermined number of intervals, each of the predetermined number of intervals comprising a subrange between a first number of TCP connections and a second number of TCP connections, and each of the subrange associated with an alpha value,
   determining a current interval from the predetermined number of intervals for the plurality of TCP connections,
   determining an alpha value based on the determined current interval, and
   determining the adaptive idle timeout value by multiplying a predetermined adaptive idle timeout value with the determined alpha value;
   taking the adaptive idle timeout value out of play when a number of established TCP connections to a server is lower than a first threshold value, the first threshold value being lower than the second threshold value;
   communicating the adaptive idle timeout value to an application control engine; and
   making loadbearing decisions at the application control engine, the loadbearing decisions comprising silently clearing out established TCP connections determined to be idle based on the adaptive idle timeout value without providing a trigger to the cleared TCP connections.

2. The method of claim 1, further comprising: clearing idle TCP connections that have been idle for a period longer than the adaptive idle timeout value.

3. The method of claim 1, further comprising:
   decreasing the adaptive idle timeout by multiplication with the alpha value when the number of established TCP connections to the server is greater than or equal to the second threshold value.

4. The method of claim 1, wherein the second threshold value is a user-configurable value.

5. The method of claim 1, wherein the alpha value is automatically calculated based on system conditions.

6. The method of claim 5, further comprising: decreasing the alpha value as the number of established TCP connections to the server increases.

7. The method of claim 5, further comprising: increasing the alpha value as the rate of newly established TCP connections to the server decreases.

8. The method of claim 1, further comprising:
   decreasing the alpha value as the number of established TCP connections to the server reaches an interval between the second threshold value and a maximum number of available connections.

9. The method of claim 1, wherein the predetermined number of intervals is a user-configurable value.

10. A method comprising:
    determining an adaptive idle timeout value, wherein determining the adaptive idle timeout value comprises:
    classifying a range between a second threshold value and a maximum value for TCP connections into a predetermined number of intervals, each of the predetermined number of intervals comprising a subrange between a first number of TCP connections and a second number of TCP connections, and each of the subrange associated with an alpha value,
    determining a current interval from the predetermined number of intervals for the plurality of TCP connections,
    determining an alpha value based on the determined current interval, and
    determining the adaptive idle timeout value by multiplying a predetermined adaptive idle timeout value with the determined alpha value;
    removing TCP connections at a network device that have been idle for a period longer than the adaptive idle timeout;
    disabling the adaptive idle timeout value when the number of established TCP connections to a server is lower than a first threshold value;
    communicating the adaptive idle timeout to an application control engine; and
    making loadbearing decisions at the application control engine, the loadbearing decisions comprising clearing out established TCP connections determined to be idle based on the adaptive idle timeout value.

11. The method of claim 10, further comprising: decreasing the adaptive idle timeout value as the total number of established TCP connections increases.

12. The method of claim 11, further comprising: determining whether the total number of established TCP connections is above the second threshold value.

13. The method of claim 11, further comprising: triggering a modification of the adaptive idle timeout value at a determined interval threshold.

14. A system comprising: a server device, wherein the server device:
- determines an adaptive idle timeout value, wherein the server device determines the adaptive idle timeout value comprises the server device:
  - divides a range between a second threshold value and a maximum value for TCP connections into a predetermined number of intervals, each of the predetermined number of intervals comprising a subrange between a first number of TCP connections and a second number of TCP connections, and each of the subrange associated with an alpha value,
  - determines a current interval from the predetermined number of intervals for the plurality of TCP connections,
  - determines an alpha value based on the determined current interval, and
  - determines the adaptive idle timeout value by multiplying a previous adaptive idle timeout value with the determined alpha value;
- disables the adaptive idle timeout value when the number of established TCP connections to a server is lower than a first threshold value; and
- communicates the adaptive idle timeout to an application control engine, wherein the application control engine makes loadbearing decisions including clearing out established TCP connections determined to be idle based on the adaptive idle timeout value.

15. The system of claim 14, wherein the server device is a proxy device.

16. The system of claim 14, further comprising a scanner programmed to determine a time which each established TCP connection has been idle.

17. The system of claim 15, wherein the proxy device is programmed to remove TCP connections which have been idle for a period longer than the adaptive idle timeout value.

18. The system of claim 14, wherein the server device is further programmed to: decrease the adaptive idle timeout when the number of established TCP connections to the server is greater than or equal to the second threshold value.

19. The system of claim 18, wherein the server device is further programmed to: decrease the alpha value as the rate of newly established TCP connection to the server increases.

* * * * *